(12) United States Patent
Kuo et al.

(10) Patent No.: US 10,079,802 B2
(45) Date of Patent: Sep. 18, 2018

(54) NETWORK TRANSMISSION METHOD AND NETWORK TRANSMISSION SYSTEM FOR A MULTI-LAYER NETWORK ADDRESS TRANSLATOR STRUCTURE

(71) Applicant: VIVOTEK INC., New Taipei (TW)

(72) Inventors: Chia-Ming Kuo, New Taipei (TW); Hua-Syuan Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 227 days.

(21) Appl. No.: 15/139,310

(22) Filed: Apr. 26, 2016

(65) Prior Publication Data

US 2016/0380964 A1 Dec. 29, 2016

(30) Foreign Application Priority Data

Jun. 23, 2015 (TW) .............................. 104120068 A (51) Int. Cl.
*G06F 15/16* (2006.01)
*H04L 29/12* (2006.01)
(Continued)

(52) U.S. Cl.
CPC ........ *H04L 61/256* (2013.01); *H04L 61/2514* (2013.01); *H04L 61/2517* (2013.01); *H04L 67/104* (2013.01); *H04L 69/16* (2013.01)

(58) Field of Classification Search
CPC ............... H04L 67/104; H04L 61/2575; H04L 65/1069; H04L 61/2514; H04L 63/029;
(Continued)

(56) References Cited

U.S. PATENT DOCUMENTS 7,912,046 B2    3/2011   Li
7,962,627 B2    6/2011   Lin
(Continued)

FOREIGN PATENT DOCUMENTS

TW       201521392 A    6/2015
TW       201532414 A    8/2015

OTHER PUBLICATIONS

Peer-to-Peer Communication Across Network Address Translators by Bryan Ford, Pyda Srisuresh, Dan Kegel,2005 [http://www.usenix.org/legacy/event/usenix05/tech/general/full_papers/ford/ford.pdf].

*Primary Examiner* — Arvin Eskandarnia
*Assistant Examiner* — Thao Duong
(74) *Attorney, Agent, or Firm* — Winston Hsu (57) ABSTRACT

A peer-to-peer server sends a first internal internet protocol (IP) address and a first internal port number of a first node to a second node, and sends a second internal IP address and a second internal port number of the second node to the first node. The first node sends a first packet to the second internal IP address and the second internal port number via a network address translator. The network address translator send a second packet corresponding to the first packet from an intermediary IP address and an intermediary port number to the second node. The second node sends a third packet to the intermediary IP address and the intermediary port number. The network address translator performs a lookup operation to send a fourth packet corresponding to the third packet to the first internal IP address and the first internal port number.

14 Claims, 5 Drawing Sheets

(51) Int. Cl.
*H04L 29/08* (2006.01)
*H04L 29/06* (2006.01)

(58) Field of Classification Search
CPC ............. H04L 61/2589; H04L 12/2818; H04L 65/403; H04L 61/2564; H04W 84/12; H04W 76/023; H04W 88/04; H04W 12/06; H04W 88/02; H04W 88/08; G06F 17/30873
See application file for complete search history.

(56) References Cited

U.S. PATENT DOCUMENTS

| | | | |
|---|---|---|---|
| 2004/0190549 A1* | 9/2004 | Huitema | H04L 29/12358 370/466 |
| 2006/0182100 A1* | 8/2006 | Li | H04L 29/12009 370/389 |
| 2009/0028167 A1* | 1/2009 | Takeda | H04L 29/12528 370/401 |
| 2009/0043889 A1* | 2/2009 | Gobara | H04L 29/12509 709/225 |
| 2010/0146126 A1* | 6/2010 | Lin | H04L 29/12509 709/228 |

\* cited by examiner

NETWORK TRANSMISSION METHOD AND NETWORK TRANSMISSION SYSTEM FOR A MULTI-LAYER NETWORK ADDRESS TRANSLATOR STRUCTURE

CROSS REFERENCE TO RELATED APPLICATION

This application claims priority to Taiwan Patent Application No. 104120068, filed Jun. 23, 2015, and incorporated herein by reference in its entirety.

BACKGROUND OF THE INVENTION

1. Field of the Invention

The present invention is related to a network transmission method and a network transmission system, and more particularly, a network transmission method and a network transmission system used for a multi-layer network address translator structure.

2. Description of the Prior Art

Figure 1:
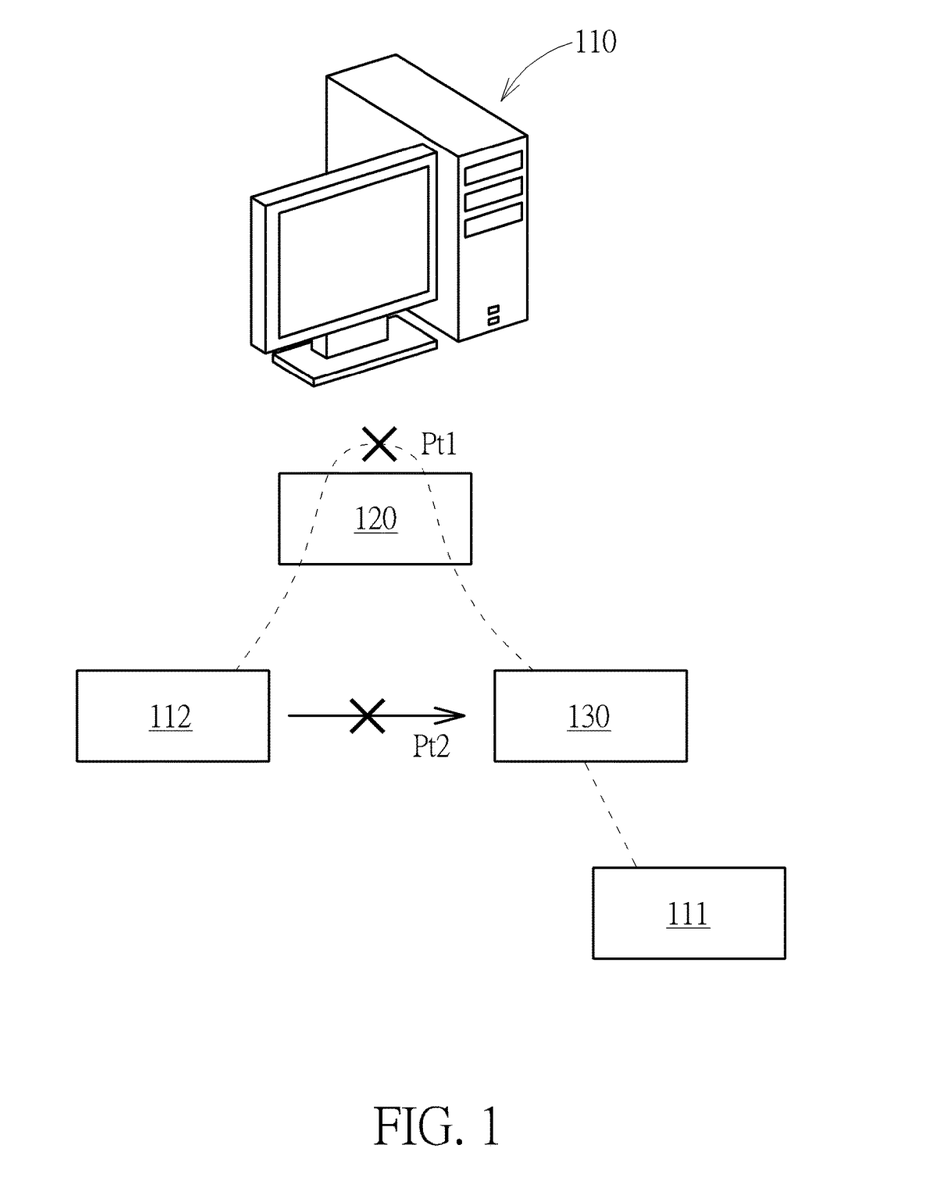
FIG. 1 illustrates that a peer-to-peer connection fails to be built under a multi-layer network address translator structure according to a prior art.

With the development of network technology, peer-to-peer connections have been widely used. By using peer-to-peer connections, multiple nodes can be connected to one another for exchanging data without a relay server. However, when nodes are located under a structure of multi-layer network address translator, it is difficult to build a peer-to-peer connection between two nodes. FIG. 1 illustrates that a peer-to-peer connection fails to be built under a multi-layer network address translator structure according to a prior art. A network node 112 and a network address translator 130 are located under a network address translator 120, and a network node 111 is located under the network address translator 130. When the server 110 tries to arrange a peer-to-peer connection between the nodes 111 and 112, it will fail to connect the two nodes 111 and 112 (through the path Pt1) by using the external addresses and the external port numbers of the two nodes 111 and 112 corresponding to the network address translator 120 because of the hairpinning limitation defined in the document RFC 5128 issued by Internet Engineering Task Force (IETF). It will also fail to build the peer-to-peer connection between the two nodes 111 and 112 by using the internal addresses and internal port numbers of the nodes 111 and 112. The reason is, since the two nodes are not of a same layer of the hierarchy of the multi-layer network address translator structure, when the node 112 sends a packet toward the internal address and the internal port number of the node 111, the packet cannot be sent to the node 111 though the network address translator 130 (as the path Pt2). Hence, a solution is required for resolving the abovementioned problem of failing to build a peer-to-peer connection in the field.

SUMMARY OF THE INVENTION

An embodiment of the present invention discloses a network transmission method. The method includes a peer-to-peer server receiving a request related to a peer-to-peer connection between a first node and a second node; the peer-to-peer server sending a first internal internet protocol address and a first internal port number of the first node to the second node, and sending a second internal internet protocol address and a second internal port number of the second node to the first node, herein the first node is connected to the peer-to-peer server via a network address translator and a top-layer network address translator, the second node is connected to the peer-to-peer server via the top-layer network address translator, and the network address translator has an intermediary internet protocol address; the first node sending a first packet to the second internal internet protocol address and the second internal port number of the second node from the first internal internet protocol address and the first internal port number via the network address translator; the network address translator assigning an intermediary port number; the network address translator sending a second packet corresponding to the first packet to the second internal internet protocol address and the second internal port number of the second node from the intermediary internet protocol address and the intermediary port number; the second node sending a third packet to the intermediary internet protocol address and the intermediary port number; and the network address translator performing a lookup operation and sending a fourth packet corresponding to the third packet to the first internal internet protocol address and the first internal port number to build the peer-to-peer connection between the first node and the second node.

Another embodiment of the present invention discloses a network transmission method. The method includes a peer-to-peer server receiving a request related to a peer-to-peer connection between a first node and a second node; the peer-to-peer server sending a first internal internet protocol address and a first internal port number of the first node to the second node, and sending a second internal internet protocol address and a second internal port number of the second node to the first node, wherein the first node is connected to the peer-to-peer server via N network address translators and a top-layer network address translator, the second node is connected to the peer-to-peer server via the top-layer network address translator, the N network address translators comprise a first network address translator to an Nth network address translator, and the first network address translator to the Nth network address translator have an first intermediary internet protocol address to an Nth intermediary internet protocol address respectively; the first node sending a first packet to the second internal internet protocol address and the second internal port number from the first internal internet protocol address and the first internal port number via the N network address translators; the first network address translator to the Nth network address translator assigning a first intermediary port number to an Nth intermediary port number respectively; the first network address translator to the (N−1)th network address translator sending a second packet to an Nth packet corresponding to the first packet layer by layer from the first intermediary internet protocol address to the (N−1)th intermediary internet protocol address so as to send the Nth packet to the Nth network address translator; the Nth network address translator sending an (N+1)th packet corresponding to the first packet to the second internal internet protocol address and the second internal port number of the second node from the Nth intermediary internet protocol address and the Nth intermediary port number; the second node sending an (N+2)th packet to the Nth intermediary internet protocol address and the Nth intermediary port number; and the Nth network address translator to the first network address translator performing a first lookup operation to an Nth lookup operation and sequentially sending an (N+3)th packet to a (2N+2)th packet corresponding to the (N+2)th packet layer by layer to send the (2N+2)th packet to the first internal internet protocol address and the first internal port number to build the peer-to-peer connection between the first node and the second node. N is a positive integer larger than one.

Yet another embodiment of the present invention discloses a network transmission system including a peer-to-peer server, a top-layer network address translator, a first node, a second node and a network address translator. The peer-to-peer server is used to receive a request related to a peer-to-peer connection between the first node and the second node, send a first internal internet protocol address and a first internal port number of the first node to the second node, and send a second internal internet protocol address and a second internal port number of the second node to the first node. The top-layer network address translator is used to translate network addresses. The first node has the first internal internet protocol address and the first internal port number, is connected to the peer-to-peer server via the network address translator and the top-layer network address translator, and is used to send a first packet to the second internal internet protocol address and the second internal port number of the second node from the first internal internet protocol address and the first internal port number of the first node via the network address translator, and receive a fourth packet. The second node has the second internal internet protocol address and the second internal port number, is connected to the peer-to-peer server via the top-layer network address translator, and is used to receive a second packet corresponding to the first packet and send a third packet to an intermediary internet protocol address and an intermediary port number. The network address translator has the intermediary internet protocol address, is used to assign the intermediary port number, send the second packet from the intermediary internet protocol address and the intermediary port number to the second internal internet protocol address and the second internal port number of the second node, receive the third packet, perform a lookup operation, and send the fourth packet corresponding to the third packet to the first internal internet protocol address and the first internal port number to build the peer-to-peer connection between the first node and the second node.

Yet another embodiment of the present invention discloses the network transmission system including a peer-to-peer server, a top-layer network address translator, a first node, a second node and N network address translators. The peer-to-peer server is used to receive a request related to a peer-to-peer connection between a first node and a second node, send a first internal internet protocol address and a first internal port number of the first node to the second node, and send a second internal internet protocol address and a second internal port number of the second node to the first node. The top-layer network address translator is used to translate network addresses. The first node has the first internal internet protocol address and the first internal port number, is connected to the peer-to-peer server via the N network address translators and the top-layer network address translator, and is used to send a first packet to the second internal internet protocol address and the second internal port number of the second node from the first internal internet protocol address and the first internal port number of the first node via the N network address translators, and receive a (2N+2)th packet. The second node has the second internal internet protocol address and the second internal port number, is connected to the peer-to-peer server via the top-layer network address translator, and is used to receive an (N+1)th packet corresponding to the first packet, and send an (N+2)th packet to an Nth intermediary internet protocol address and an Nth intermediary port number. The N network address translators include a first network address translator to an Nth network address translator. The first network address translator to the Nth network address translator have a first intermediary internet protocol address to the Nth intermediary internet protocol address respectively. The first network address translator to the Nth network address translator assign a first intermediary port number to the Nth intermediary port number respectively. The first network address translator to the (N−1)th network address translator send a second packet to an Nth packet corresponding to the first packet from the first intermediary internet protocol address to the (N−1)th intermediary internet protocol address layer by layer to send the Nth packet to the Nth network address translator. The Nth network address translator sends the (N+1) packet to the second internal internet protocol address and the second internal port number of the second node from the Nth intermediary internet protocol address and the Nth intermediary port number. The Nth network address translator to the first network address translator perform a first lookup operation to an Nth lookup operation, and the Nth network address translator to the first network address translator sequentially send an (N+3)th packet to the (2N+2)th packet corresponding to the (N+2)th packet layer by layer to send the (2N+2)th packet to the first internal internet protocol address and the first internal port number to build the peer-to-peer connection between the first node and the second node. N is a positive integer larger than one.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
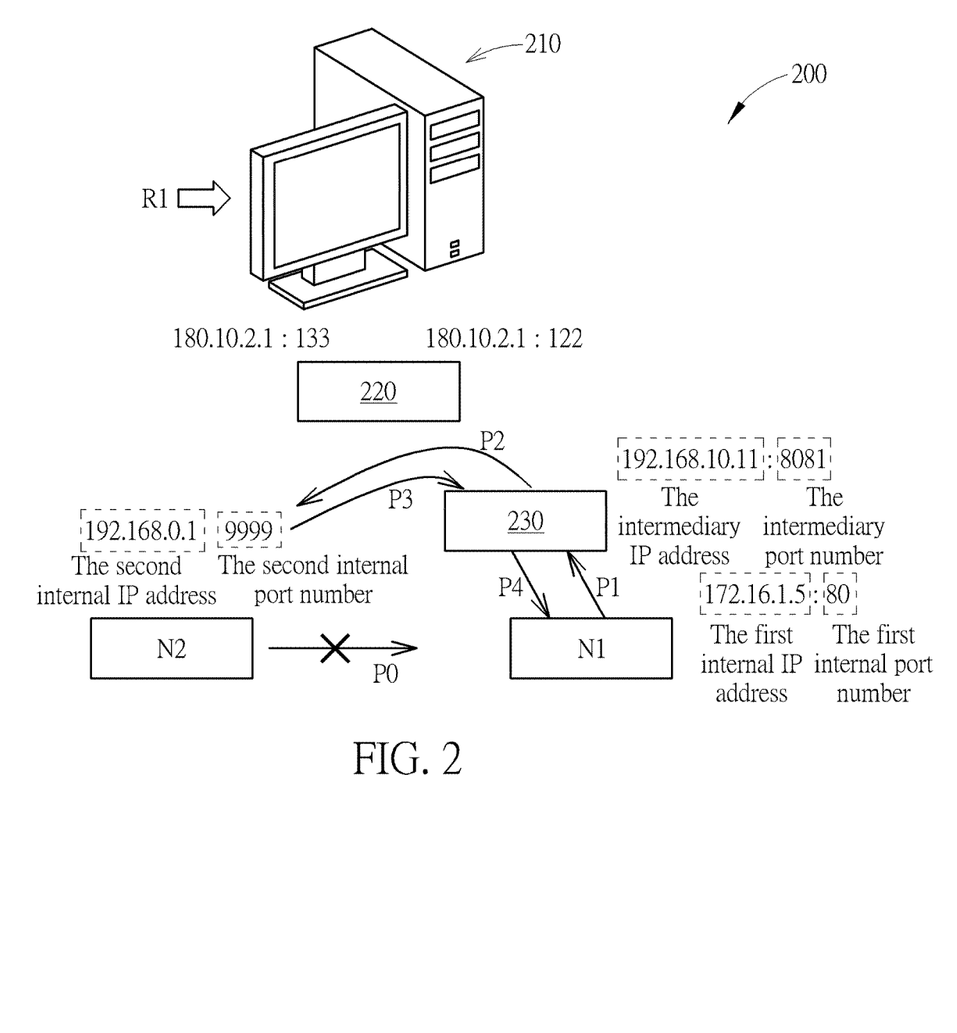
FIG. 2 illustrates a network transmission system according to an embodiment of the present invention.

FIG. 2 illustrates a network transmission system 200 according to an embodiment of the present invention. The network transmission system 200 may include a peer-to-peer server 210, a top-layer network address translator (NAT) 220, a first node N1, a second node N2 and an NAT 230. The second node N2 and the NAT 230 may be located under the top-layer NAT 220, and the first node N1 may be located under the NAT 230. The peer-to-peer server 210 may be used to receive a request R1 related to a peer-to-peer connection between the first node N1 and the second node N2, send a first internal internet protocol (IP) address (e.g. 172.16.1.5 in FIG. 2) and a first internal port number (e.g. 80 in FIG. 2) of the first node N1 to the second node N2, and send a second internal IP address (e.g. 192.168.0.1 in FIG. 2) and a second internal port number (e.g. 9999 in FIG. 2) of the second node N2 to the first node N1. The first internal IP address and the first internal port number may be recognized and registered to the peer-to-peer server 210 by the first node N1 according to a conventional technique. The second internal IP and the second internal port number may be recognized and registered to the peer-to-peer server 210 by the node N2. The top-layer NAT 220 may be used to translate network addresses, and may have an external IP address (e.g. 180.10.2.1 in FIG. 2). The first node N1 may have the foresaid first internal IP address and the first internal port number, be connected to the peer-to-peer server 210 via the NAT 230 and the top-layer NAT 220, and be used to send a first packet P1 to the second internal IP address and the second internal port number (e.g. 192.168.0.1:9999) of the second node N2 from the first internal IP address and the first internal port number (e.g. 172.16.1.5:80) of the first node N1 via the NAT 230, and receive a fourth packet P4. The second node N2 may have the second internal IP address and the second internal port number (e.g. 192.168.0.1:9999), be connected to the peer-to-peer server 210 via the top-layer NAT 220, and be used to send a zeroth packet P0 from the second internal IP address and the second internal port number (e.g. 192.168.0.1:9999) to the first internal IP address and the first internal port number (e.g. 172.16.1.5:80) of the node N1, receive a second packet P2 corresponding to the first packet P1, and send a third packet P3 to an intermediary IP address and an intermediary port number (e.g. 192.168.10.11:8081 corresponding to the NAT 230 in FIG. 2). The NAT 230 may have the intermediary IP address (e.g. 192.168.10.11), be used to assign the intermediary port number (e.g. 8081), send the second packet P2 from the intermediary IP address and the intermediary port number (e.g. 192.168.10.11:8081) to the second internal IP address and the second internal port number (e.g. 192.168.0.1:9999) of the node N2, receive the third packet P3, perform a lookup operation for mapping IP addresses, and send the fourth packet P4 corresponding to the third packet P3 to the first internal IP address and the first internal port number (e.g. 172.16.1.5:80) to build the peer-to-peer connection between the nodes N1 and N2.

The IP addresses and port numbers of sources and destinations according to the embodiment of FIG. 2 may be shown in Table-1:

TABLE 1

| Corresponding packet | Source IP and port number | Destination IP and port number | Note |
|---|---|---|---|
| The first packet P1 | 172.16.1.5:80 (The first internal IP address and the first internal port number) | 192.168.0.1:9999 (The second internal IP address and the second internal port number) | The second packet P2 may correspond to the first packet P1. The source IP address and port number of the packet P2 may be translated and modified by the NAT 230 by comparing with the packet P1. |
| The second packet P2 | 192.168.10.11:8081 (The intermediary IP address and the intermediary port number) | 192.168.0.1:9999 (The second internal IP address and the second internal port number) | |
| The third packet P3 | 192.168.0.1:9999 (The second internal IP address and the second internal port number) | 192.168.10.11:8081 (The intermediary IP address and the intermediary port number) | The fourth packet P4 may correspond to the third packet P3. The destination IP address and port number of the packet P4 may be translated and modified by the NAT 230 by com paring with the packet P3. |
| The fourth packet P4 | 192.168.0.1:9999 (The second internal IP address and the second internal port number) | 172.16.1.5:80 (The first internal IP address and the first internal port number) | |
| The zeroth packet P0 | 192.168.0.1:9999 (The second internal IP address and the second internal port number) | 172.16.1.5:80 (The first internal IP address and the first internal port number) | The zeroth packet P0 may fail to be sent to the node N1. |

As shown in Table-1, the packet P2 may correspond to the packet P1. By comparing with the packet P1, the source IP address and port number of the packet P2 may be translated and modified by the NAT 230, but the destination IP address and port number of the packet P2 may be kept as the packet P1 without being modified. In other words, the destination IP addresses and port numbers of the packets P1 and P2 may be identical, but the source IP address and the source port number of the packet P2 are different from the source IP address and the source port number of the packet P1. The packet P4 may correspond to the packet P3. By comparing with the packet P3, the source IP address and port number of the packet P4 may be kept as the packet P3 without being modified, but the destination IP address and port number of the packet P4 may be translated and modified by the NAT 230. In other words, the source IP addresses and port numbers of the packets P3 and P4 may be identical, but the destination IP address and the destination port number of the packet P4 are different from the destination IP address and the destination port number of the packet P3. Each of the packets P0-P4 may be a User Datagram Protocol (UDP) packet or a Transmission Control Protocol (TCP) packet. A file header of the packet P2 may carry information of the source IP address and port number such as the intermediary IP address and the intermediary port number (e.g. 192.168.10.11:8081) for the second node N2 to use the intermediary IP address and the intermediary port number (e.g. 192.168.10.11:8081) as the destination IP address and port number when sending back the packet P3. The NAT 230 may perform a lookup operation, such as using a lookup table, for mapping IP addresses. The destination IP address and port number of the packet P3 (e.g. 192.168.10.11:8081) may be mapped to the first internal IP address and the first internal port number (e.g. 172.16.1.5:80) being used by the NAT transversal of sending the packet P1 from the internal side to the external side of the NAT 230. Hence, the NAT 230 may be able to send the packet P4 corresponding to the packet P3 to the first internal IP address and the first internal port number (e.g. 172.16.1.5:80) of the node N1. In other words, the packet P3 may be sent from the external side to the internal side of the NAT 230 without being blocked by the firewall of the NAT 230 because the packet P1 has been sent from the internal side to the external side of the NAT 230 by the NAT transversal. As described, the node N1 may send packets to the node N2 by using the packets P1 and P2, and the node N2 may send packets to the node N1 by using the packets P3 and P4, so the peer-to-peer connection between the first node N1 and the second node N2 may be built successfully according to the embodiment of the present invention.

As shown in FIG. 2, the node N2 may send the zeroth packet P0 corresponding the packet P1 sent by the node N1 to the first internal IP address and the first internal port number (e.g. 172.16.1.5:80) of the node N1 by using the information provided by the peer-to-peer server 210. However, since the node N1 is located under the NAT 230, the zeroth packet P0 may be blocked by the firewall of the NAT 230 and fail to be sent through the firewall of the NAT 230 to the node N1. It may be necessary to use the packets P1 to P4 to build the peer-to-peer connection between the nodes N1 and N2.

Figure 3:
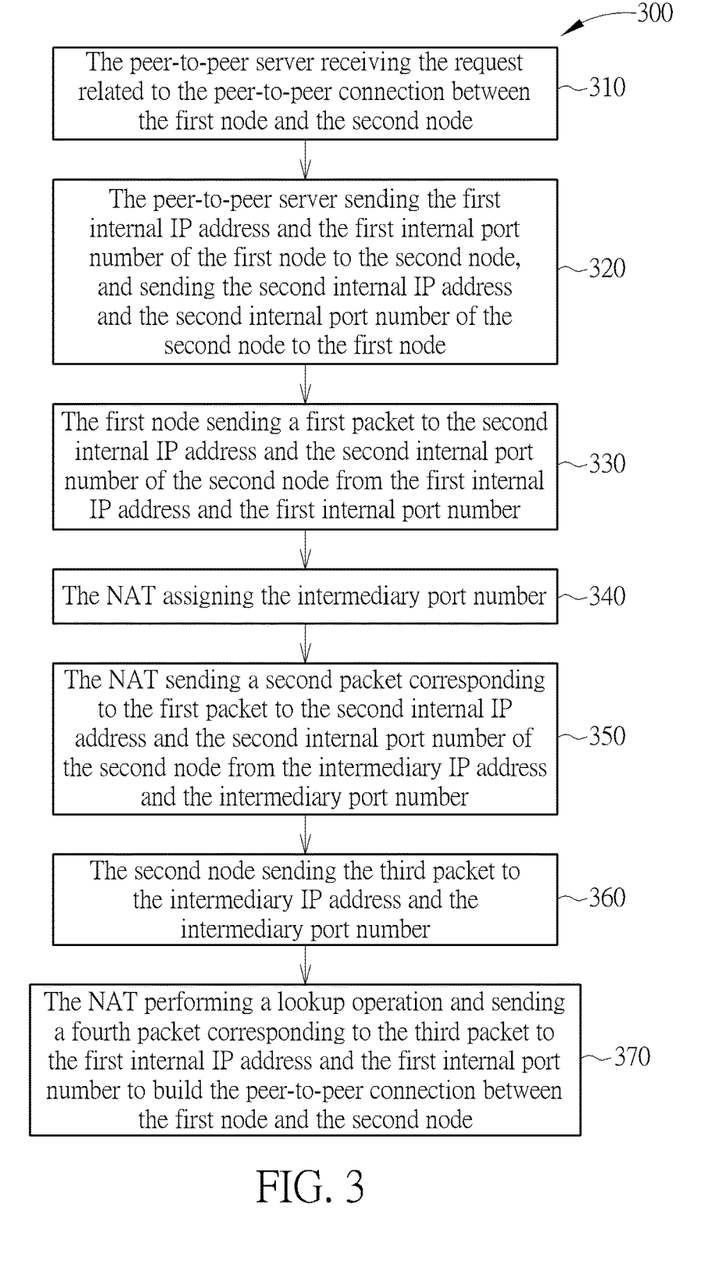
FIG. 3 illustrates a flowchart of the network transmission method corresponding to the network transmission system of FIG. 2.

FIG. 3 illustrates a flowchart of the network transmission method 300 corresponding to the network transmission system 200 of FIG. 2. The network transmission method 300 may include:

Step 310: the peer-to-peer server 210 receiving the request R1 related to the peer-to-peer connection between the first node N1 and the second node N2;

Step 320: the peer-to-peer server 210 sending the first internal IP address and the first internal port number of the first node N1 to the second node N2, and sending the second internal IP address and the second internal port number of the second node N2 to the first node, wherein the first node N1 may be connected to the peer-to-peer server 210 via the NAT 230 and the top-layer NAT 220, the second node N2 may be connected to the peer-to-peer server 210 via the top-layer network address translator 220, and the NAT 230 may have the intermediary IP address (e.g. 192.168.10.11);

Step 330: the first node N1 sending a first packet P1 to the second internal IP address and the second internal port number (e.g. 192.168.0.1:9999) of the second node N2 from the first internal IP address and the first internal port number (e.g. 172.16.1.5:80) via the NAT 230;

Step 340: the NAT 230 assigning the intermediary port number (e.g. 8081);

Step 350: the NAT 230 sending a second packet P2 corresponding to the first packet P1 to the second internal IP address and the second internal port number (e.g. 192.168.0.1:9999) of the second node N2 from the intermediary IP address and the intermediary port number (e.g. 192.168.10.11:8081);

Step 360: the second node N2 sending the third packet P3 to the intermediary IP address and the intermediary port number (e.g. 192.168.10.11:8081); and Step 370: the NAT 230 performing a lookup operation and sending a fourth packet P4 corresponding to the third packet P3 to the first internal IP address and the first internal port number (e.g. 172.16.1.5:80) to build the peer-to-peer connection between the first node N1 and the second node N2.

The request R1 may be sent from the node N1 to ask for building the peer-to-peer connection with the node N2, or be sent from the node N2 to ask for building the peer-to-peer connection with the node N1. The peer-to-peer server 210 may arrange a peer-to-peer connection for at least two suitable network nodes (e.g. the nodes N1 and N2). The internal IP addresses and the internal port numbers of the at least two suitable network nodes may be provided to one another of the nodes by the server 210 as described above. According to another embodiment of the present invention, the external IP addresses and the external port numbers corresponding to the top-layer NAT 210 of the at least two nodes may be sent to one another of the nodes by the server 210. The internal IP addresses, the internal port numbers, the external IP addresses and the external port numbers of the nodes N1 and N2 are as shown in Table-2:

TABLE 2

| The network node | The internal IP address | The internal port number | The external IP address | The external port number |
|---|---|---|---|---|
| The first node N1 | 172.16.1.5 | 80 | 180.10.2.1 | 122 |
| The second node N2 | 192.168.0.1 | 9999 | 180.10.2.1 | 133 |

The server 210 may send the first internal IP address and the first internal port number (e.g. 172.16.1.5:80) and/or the first external IP address and the first external port number (e.g. 180.10.2.1:122) of the node N1 to the node N2, or send the second internal IP address and the second internal port number (e.g. 192.168.0.1:9999) and/or the second external IP address and the second external port number (e.g. 180.10.2.1:133) of the node N2 to the node N1 to build the peer-to-peer connection between the nodes N1 and N2. In the example of FIG. 2, since the nodes N1 and N2 are both located under the top-layer NAT 220, the external IP addresses of the nodes N1 and N2 may be identical, such as 180.10.2.1. By using the conventional technique, the peer-to-peer connection may fail by using the external addresses and the external port numbers of the two nodes because of the hairpinning limitation. The peer-to-peer connection may be built successfully by using the system and method according to the embodiment of FIGS. 2-3, and the two nodes N1 and N2 may be connected to one another without needing the server 210 to act as a relay server. The workload of the server 210 may be effectively reduced.

In steps 340 and 350, when the NAT 230 assigning the intermediary port number, a table may be generated to map the intermediary IP address and the assigned intermediary port number (e.g. 192.168.10.11:8081) to the corresponding first internal IP address and the first internal port number as shown in Table-3.

TABLE 3

| The number of assignment | The intermediary IP address and the assigned intermediary port number | The corresponding first internal IP address and the first internal port number |
|---|---|---|
| 1 | 192.160.10.11:8081 | 172.16.1.5:80 |

The table such as Table-3 may be stored in the NAT 230. When performing the steps 360 and 370, the NAT 230 may perform the lookup operation by looking up the assigned intermediary port number in the table like Table-3 to obtain the corresponding first internal IP address and the first internal port number to send the packet P4 corresponding to packet P3 to the node N1. Table-3 shown above is used as an example rather than the practical program code.

By using the method and system disclosed in FIGS. 2-3, the shortcoming of failing to build the peer-to-peer connection of the prior art may be overcome.

Figure 4:
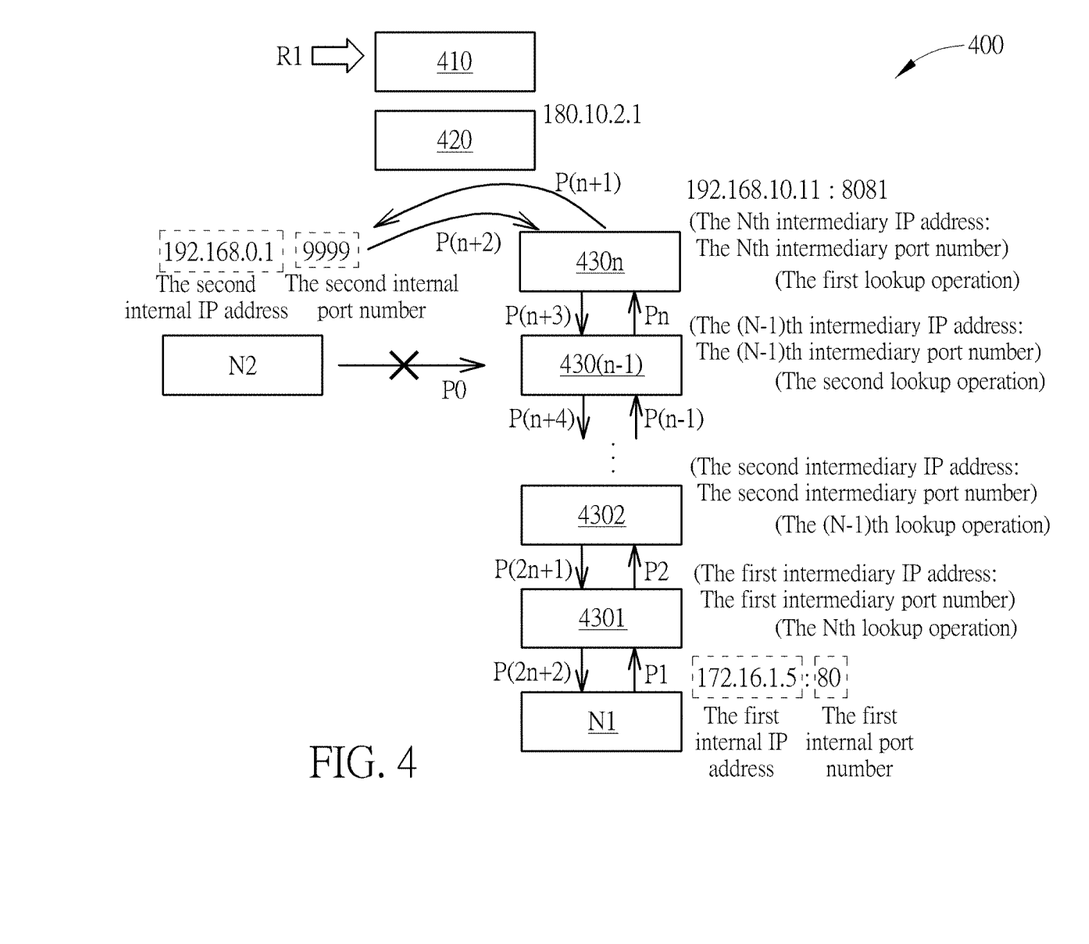
FIG. 4 illustrates a network transmission system according to another embodiment of the present invention.

FIG. 4 illustrates a network transmission system 400 according to another embodiment of the present invention. The system 400 may be similar to the system 200 of FIG. 4, but the system 400 may include more NATs than the system 200 and form an N-layer NAT structure. The system 400 may include a peer-to-peer server 410, a top-layer NAT 420, the first node N1, the second node N2 and N NATs 4301 to 430n. The NAT 4301 may be located under the NAT 4302, the NAT 4302 may be located under the NAT 4303, and so forth. The node N2 and the NAT 430n may be located under the top-layer NAT 420, and the node N1 may be located under the NAT 4301. The server 410 may be used to receive the request R1 related to a peer-to-peer connection between the node N1 and the node N2, send the first internal IP address and the first internal port number (e.g. 172.16.1.5:80) of the node N1 to the node N2, and send the second internal IP address and the second internal port number (e.g. 192.168.0.1:9999) of the node N2 to the node N1. The first internal IP address and the first internal port number may be recognized and registered to the server 410 by the node N1 according to a conventional technique. The second internal IP and the second internal port number may be recognized and registered to the server 410 by the node N2. The top-layer NAT may be used to translate network addresses, and have an external IP address (e.g. 180.10.2.1). The node N1 may have the first internal IP address and the first internal port number (e.g. 172.16.1.5:80), and be connected to the server 410 via the N NATs 4301-430n and the top-layer NAT 420. The node N2 may have the second internal IP address and the second internal port number (e.g. 192.168.0.1:9999), be connected to the server 410 via the top-layer NAT 420. In the N NATs 4301-430n, the NAT 4301 may be a first NAT, the NAT 4302 may be a second NAT, . . . , and the NAT 430n may be an Nth NAT. The first NAT 4301 to the Nth NAT 430n may have a first intermediary IP address to the Nth intermediary IP address respectively. The first NAT 4301 to the Nth NAT 430n may assign a first intermediary port number to the Nth intermediary port number respectively. The first NAT 4301 to the (N−1)th NAT may send a second packet P2 to an Nth packet Pn corresponding to the first packet P1 from the first intermediary IP address to the (N−1)th intermediary IP address layer by layer to send the Nth packet Pn to the Nth NAT 430n. The Nth NAT 430n may send the (N+1) packet P(n+1) to the second internal IP address and the second internal port number (e.g. 192.168.0.1:9999) of the node N2 from the Nth intermediary IP address and the Nth intermediary port number (e.g. 192.168.10.11:8081). The Nth NAT 430n may receive an (N+2)th packet P(n+2). The Nth NAT 430n to the first NAT 4301 may perform a first lookup operation to an Nth lookup operation, and sequentially send an (N+3)th packet P(n+3) corresponding to the (N+2)th packet P(n+2) to the (2N+2)th packet P(2n+2) layer by layer to send the (2N+2)th packet to the first internal IP address and the first internal port number (e.g. 172.16.1.5:80) to build the peer-to-peer connection between the nodes N1 and N2. N may be a positive integer larger than one, and n (corresponding to N) may also be a positive integer larger than one.

Figure 5:
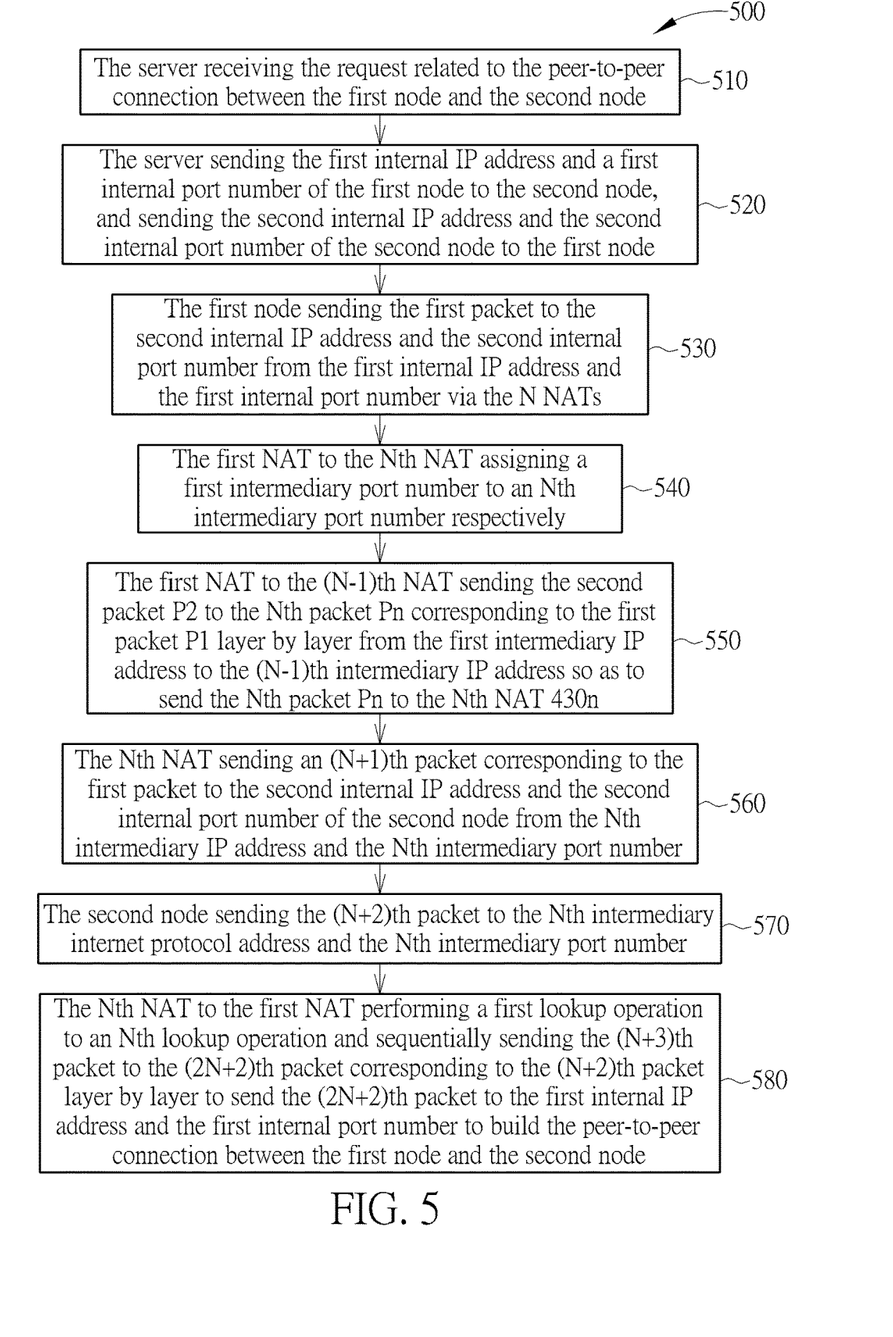
FIG. 5 illustrates a flowchart of a network transmission method corresponding to the network transmission system of FIG. 4.

FIG. 5 illustrates a flowchart of a network transmission method 500 corresponding to the network transmission system 400 shown in FIG. 4. The method 500 may include:

Step 510: the server 410 receiving the request R1 related to the peer-to-peer connection between the node N1 and the node N2;

Step 520: the server 410 sending the first internal IP address and a first internal port number (e.g. 172.16.1.5:80) of the node N1 to the node N2, and sending the second internal IP address and the second internal port number (e.g. 192.168.0.1:9999) of the node N2 to the node N1;

Step 530: the node N1 sending the first packet P1 to the second internal IP address and the second internal port number (e.g. 192.168.0.1:9999) from the first internal IP address and the first internal port number (e.g. 172.16.1.5:80) via the N NATs 4301-430n;

Step 540: the first NAT 4301 to the Nth NAT 430n assigning a first intermediary port number to an Nth intermediary port number respectively;

Step 550: the first NAT to the (N−1)th NAT sending the second packet P2 to the Nth packet Pn corresponding to the first packet P1 layer by layer from the first intermediary IP address to the (N−1)th intermediary IP address so as to send the Nth packet Pn to the Nth NAT 430n;

Step 560: the Nth NAT 430n sending an (N+1)th packet P (n+1) corresponding to the first packet P1 to the second internal IP address and the second internal port number (e.g. 192.168.0.1:9999) of the node N2 from the Nth intermediary IP address and the Nth intermediary port number;

Step 570: the node N2 sending the (N+2)th packet P (n+2) to the Nth intermediary IP address and the Nth intermediary port number; and Step 580: the Nth NAT 430n to the first NAT 4301 performing a first lookup operation to an Nth lookup operation and sequentially sending the (N+3)th packet P (n+3) to the (2N+2)th packet P (2n+2) corresponding to the (N+2)th packet P (n+2) layer by layer to send the (2N+2)th packet P (2n+2) to the first internal IP address and the first internal port number (e.g. 172.16.1.5:80) to build the peer-to-peer connection between the node N1 and the node N2.

The system 400 and method 500 shown in FIGS. 4-5 may be similar to the system 200 and method 300 shown in FIGS. 2-3. However, the node N1 is located under multiple layers of NATs. If the nodes N1 and N2 sends packets to one another to build a peer-to-peer connection by the conventional technique, the node N2 may send the packet P0 corresponding to the packet P1 from the second internal IP address and the second internal port number (e.g. 192.168.0.1:9999) to the first internal IP address and the first internal port number (e.g. 172.16.1.5:80) of the node N1. The packet P0 will be blocked by the firewall, and fail to be sent from the external side to the internal side of the N NATs 430n-4301. The peer-to-peer connection will fail to be built by using the conventional technique. However, if using the method 500 corresponding to FIGS. 4-5, the peer-to-peer connection may be well built. In steps 530-560, when sending the packets P1-P(n+1) layer by layer, the NAT 4301 to the NAT 430n may generate mapping tables or other types of log data to record the mapping relationship between the first intermediary IP address and the first intermediary port number and the first internal IP address and the first internal port number, the mapping relationship between the second intermediary IP address and the second intermediary port number and the first intermediary IP address and the first intermediary port number, . . . and the mapping relationship between the Nth intermediary IP address and the Nth intermediary port number (e.g. 192.168.10.11:8081) and the (N−1)th intermediary IP address and the (N−1)th intermediary port number. In step 560, the packet P(n+1) may carry the Nth intermediary IP address and the Nth intermediary port number. For example, the Nth intermediary IP address and the Nth intermediary port number may be carried in a file header. Hence, in step 570, the Nth intermediary IP address and the Nth intermediary port number may be used as the destination IP address and port number when the node N2 sends the packet P(n+2). In step 580, the N NATs 430n-4301 may perform N lookup operations according to the foresaid data of mapping relationships so as to send the packet P(n+3) corresponding to the packet P(n+2) to the NAT 430 (n−1), send the packet P(n+4) corresponding to the packet P(n+3) to the NAT 430 (n−2), . . . , send the packet P(2n+2) corresponding to the packet P(2n+1) to the node N1 to build the peer-to-peer connection between the node N1 and the node N2.

According an embodiment of the present invention, the peer-to-peer connection between the nodes N1 and N2 may be a Session Initiation Protocol (SIP) connection and/or voice over IP (VOIP) connection. According to the embodiment of FIG. 4, each of the packets P1 to P(2n+2) may be a UDP packet or a TCP packet. The node N1 may be a smart home appliance, a terminal computer, a communication device, a portable device, a monitor and/or an audio-video device. The node N2 may be a remote control, a smart home appliance, a terminal computer, a communication device, a portable device, a monitor and/or an audio-video device. Each of the top-layer NAT 220, the top-layer NAT 420, the NAT 230 and the NATs 4301-430n may be a cone NAT or a symmetric NAT. For example, when a smart phone acts as the node N2, a audio-video host device acts as the node N1, a modem in a user's house connecting to the external network acts as the top-layer NAT 220, and a router in the user's house acts as the NAT 230, the network transmission system and method may be used to build a peer-to-peer connection between the smart phone and the audio-video host device for the user to control the device conveniently. The shortcoming of the prior art can be well overcome.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network transmission method, comprising:
a peer-to-peer server receiving a request related to a peer-to-peer connection between a first node and a second node;
the peer-to-peer server sending a first internal internet protocol address and a first internal port number of the first node to the second node, and sending a second internal internet protocol address and a second internal port number of the second node to the first node, wherein the first node is connected to the peer-to-peer server via a network address translator and a top-layer network address translator, the second node is connected to the peer-to-peer server via the top-layer network address translator, and the network address translator has an intermediary internet protocol address;
the first node sending a first packet to the second internal internet protocol address and the second internal port number of the second node from the first internal internet protocol address and the first internal port number via the network address translator;
the network address translator assigning an intermediary port number wherein the intermediary port number is fixed without being randomly changed after being assigned and is corresponding to the first node;
the network address translator sending a second packet corresponding to the first packet to the second internal internet protocol address and the second internal port number of the second node from the intermediary internet protocol address and the intermediary port number;
the second node sending a third packet to the intermediary internet protocol address and the intermediary port number; and
the network address translator performing a lookup operation and sending a fourth packet corresponding to the third packet to the first internal internet protocol address and the first internal port number to build the peer-to-peer connection between the first node and the second node wherein the peer-to-peer connection is not relayed by the peer-to-peer server.

2. The method of claim 1, wherein the request is sent from the first node to ask for building the peer-to-peer connection with the second node.

3. The method of claim 1, wherein the request is sent from the second node to ask for building the peer-to-peer connection with the first node.

4. The method of claim 1, further comprising:
the second node sending a zeroth packet from the second internal internet protocol address and the second internal port number of the second node to the first internal internet protocol address and the first internal port number of the first node;
wherein the zeroth packet fails to be sent to the first node.

5. A network transmission method, comprising:
a peer-to-peer server receiving a request related to a peer-to-peer connection between a first node and a second node;
the peer-to-peer server sending a first internal internet protocol address and a first internal port number of the first node to the second node, and sending a second internal internet protocol address and a second internal port number of the second node to the first node, wherein the first node is connected to the peer-to-peer server via N network address translators and a top-layer network address translator, the second node is connected to the peer-to-peer server via the top-layer network address translator, the N network address translators comprise a first network address translator to an Nth network address translator, and the first network address translator to the Nth network address translator have a first intermediary internet protocol address to an Nth intermediary internet protocol address respectively;

the first node sending a first packet to the second internal internet protocol address and the second internal port number from the first internal internet protocol address and the first internal port number via the N network address translators;

the first network address translator to the Nth network address translator assigning a first intermediary port number to an Nth intermediary port number respectively wherein the first intermediary port number to the Nth intermediary port number are fixed without being randomly changed after being assigned and are corresponding to the first node;

the first network address translator to the (N−1)th network address translator sending a second packet to an Nth packet corresponding to the first packet layer by layer from the first intermediary internet protocol address to the (N−1)th intermediary internet protocol address so as to send the Nth packet to the Nth network address translator;

the Nth network address translator sending an (N+1)th packet corresponding to the first packet to the second internal internet protocol address and the second internal port number of the second node from the Nth intermediary internet protocol address and the Nth intermediary port number;

the second node sending an (N+2)th packet to the Nth intermediary internet protocol address and the Nth intermediary port number; and the Nth network address translator to the first network address translator performing a first lookup operation to an Nth lookup operation and sequentially sending an (N+3)th packet to a (2N+2)th packet corresponding to the (N+2)th packet layer by layer to send the (2N+2)th packet to the first internal internet protocol address and the first internal port number to build the peer-to-peer connection between the first node and the second node wherein the peer-to-peer connection is not relayed by the peer-to-peer server;

wherein N is a positive integer larger than one.

6. The method of claim 5, wherein the request is sent from the first node to ask for building the peer-to-peer connection with the second node.

7. The method of claim 5, wherein the request is sent from the second node to ask for building the peer-to-peer connection with the first node.

8. The method of claim 5, further comprising:

the second node sending a zeroth packet from the second internal internet protocol address and the second internal port number of the second node to the first internal internet protocol address and the first internal port number of the first node;

wherein the zeroth packet fails to be sent to the first node.

9. A network transmission system, comprising:

a peer-to-peer server configured to receive a request related to a peer-to-peer connection between a first node and a second node, send a first internal internet protocol address and a first internal port number of the first node to the second node, and send a second internal internet protocol address and a second internal port number of the second node to the first node;

a top-layer network address translator configured to translate network addresses;

the first node having the first internal internet protocol address and the first internal port number, connected to the peer-to-peer server via a network address translator and the top-layer network address translator, and configured to send a first packet to the second internal internet protocol address and the second internal port number of the second node from the first internal internet protocol address and the first internal port number of the first node via the network address translator, and receive a fourth packet;

the second node having the second internal internet protocol address and the second internal port number, connected to the peer-to-peer server via the top-layer network address translator, and configured to receive a second packet corresponding to the first packet and send a third packet to an intermediary internet protocol address and an intermediary port number; and the network address translator having the intermediary internet protocol address, configured to assign the intermediary port number, send the second packet from the intermediary internet protocol address and the intermediary port number to the second internal internet protocol address and the second internal port number of the second node, receive the third packet, perform a lookup operation, and send the fourth packet corresponding to the third packet to the first internal internet protocol address and the first internal port number to build the peer-to-peer connection between the first node and the second node;

wherein the intermediary port number is fixed without being randomly changed after being assigned and is corresponding to the first node, and the peer-to-peer connection is not relayed by the peer-to-peer server.

10. The system of claim 9, wherein each of the first packet, the second packet, the third packet and the fourth packet is a User Datagram Protocol packet or a Transmission Control Protocol packet.

11. The system of claim 9, wherein the second node sends a zeroth packet from the second internal internet protocol address and the second internal port number of the second node to the first internal internet protocol address and the first internal port number of the first node, and the zeroth packet fails to be sent to the first node.

12. A network transmission system, comprising:

a peer-to-peer server configured to receive a request related to a peer-to-peer connection between a first node and a second node, send a first internal internet protocol address and a first internal port number of the first node to the second node, and send a second internal internet protocol address and a second internal port number of the second node to the first node;

a top-layer network address translator configured to translate network addresses;

the first node having the first internal internet protocol address and the first internal port number, connected to the peer-to-peer server via N network address translators and the top-layer network address translator, and configured to send a first packet to the second internal internet protocol address and the second internal port number of the second node from the first internal internet protocol address and the first internal port number of the first node via the N network address translators, and receive a (2N+2)th packet;

the second node having the second internal internet protocol address and the second internal port number, connected to the peer-to-peer server via the top-layer network address translator, and configured to receive an (N+1)th packet corresponding to the first packet, and send an (N+2)th packet to an Nth intermediary internet protocol address and an Nth intermediary port number; and the N network address translators comprising a first network address translator to an Nth network address translator, wherein the first network address translator to the Nth network address translator have a first intermediary internet protocol address to the Nth intermediary internet protocol address respectively, the first network address translator to the Nth network address translator assign a first intermediary port number to the Nth intermediary port number respectively, the first network address translator to the (N−1)th network address translator send a second packet to an Nth packet corresponding to the first packet from the first intermediary internet protocol address to the (N−1)th intermediary internet protocol address layer by layer to send the Nth packet to the Nth network address translator, the Nth network address translator sends the (N+1) packet to the second internal internet protocol address and the second internal port number of the second node from the Nth intermediary internet protocol address and the Nth intermediary port number, the Nth network address translator to the first network address translator perform a first lookup operation to an Nth lookup operation, and the Nth network address translator to the first network address translator sequentially send an (N+3)th packet to the (2N+2)th packet corresponding to the (N+2)th packet layer by layer to send the (2N+2)th packet to the first internal internet protocol address and the first internal port number to build the peer-to-peer connection between the first node and the second node;

wherein N is a positive integer larger than one, the first intermediary port number to the Nth intermediary port number are fixed without being randomly changed after being assigned and are corresponding to the first node, and the peer-to-peer connection is not relayed by the peer-to-peer server.

13. The system of claim 12, wherein each of the first packet to the (2N+2)th packet is a User Datagram Protocol packet or a Transmission Control Protocol packet.

14. The system of claim 12, wherein the second node sends a zeroth packet from the second internal internet protocol address and the second internal port number of the second node to the first internal internet protocol address and the first internal port number of the first node, and the zeroth packet fails to be sent to the first node.

* * * * *